United States Patent
Yamashita et al.

(10) Patent No.: US 11,135,749 B2
(45) Date of Patent: Oct. 5, 2021

(54) FILLING APPARATUS FOR FOAMABLE MATERIAL AND FILLING METHOD THEREFOR

(71) Applicant: SUNSTAR ENGINEERING INC., Osaka (JP)

(72) Inventors: Kiichi Yamashita, Osaka (JP); Hiroyuki Nagata, Osaka (JP)

(73) Assignee: SUNSTAR ENGINEERING INC., Osaka (JP)

( * ) Notice: Subject to any disclaimer, the term of this patent is extended or adjusted under 35 U.S.C. 154(b) by 377 days.

(21) Appl. No.: 16/020,060

(22) Filed: Jun. 27, 2018

(65) Prior Publication Data
US 2019/0001538 A1    Jan. 3, 2019

(30) Foreign Application Priority Data
Jun. 28, 2017 (JP) .............................. JP2017-126145

(51) Int. Cl.
*B29C 44/18* (2006.01)
*B29C 44/60* (2006.01)
(Continued)

(52) U.S. Cl.
CPC ............ *B29C 44/18* (2013.01); *B29C 31/068* (2013.01); *B29C 44/188* (2013.01);
(Continued)

(58) Field of Classification Search
CPC ..... B29C 44/18; B29C 44/188; B29C 44/424; B29C 44/60; B29C 31/065; B29C 31/044; B29C 31/06
See application file for complete search history.

(56) References Cited

U.S. PATENT DOCUMENTS 4,483,809 A * 11/1984 Ando ...................... C08J 9/228
                                                    264/53
5,154,088 A * 10/1992 Lehnert ................. B29B 7/7621
                                                    73/866
(Continued)

FOREIGN PATENT DOCUMENTS

DE         10123907 A1 * 11/2002 ............ C08J 9/0061
JP         S64-69308        3/1989
(Continued)

OTHER PUBLICATIONS

Impianti OMS—Ecomaster Series (Sep. 2013) (Year: 2013).*
(Continued)

*Primary Examiner* — Jacob T Minskey
*Assistant Examiner* — Virak Nguon
(74) *Attorney, Agent, or Firm* — Sheridan Ross P.C.

(57) ABSTRACT

In order to provide a filling apparatus which is capable of advantageously delivering a foamable material having a necessary amount into a closed cross section of a vehicle body, in an embodiment of the present invention, there is provided a filling apparatus for filling a closed cross section of a vehicle body with a foamable material is provided, wherein the foamable material is a foamable two-liquid polyurethane material, wherein the filling apparatus comprises a delivering part for delivering the foamable material into the closed cross section of the vehicle body, and wherein the filling apparatus further comprises an input part into which a delivery command value and correction values to set a real delivery amount are input.

19 Claims, 5 Drawing Sheets

(51) Int. Cl.
  *B29C 44/42* (2006.01)
  *B62D 25/04* (2006.01)
  *B29C 31/06* (2006.01)
  *B62D 29/00* (2006.01)
  *B29L 31/30* (2006.01)
  *B29K 75/00* (2006.01)
  *B29K 105/04* (2006.01)

(52) U.S. Cl.
  CPC ............ *B29C 44/424* (2013.01); *B29C 44/60* (2013.01); *B62D 25/04* (2013.01); *B62D 29/002* (2013.01); *B29K 2075/00* (2013.01); *B29K 2105/04* (2013.01); *B29L 2031/3002* (2013.01)

(56) References Cited

U.S. PATENT DOCUMENTS

| | | | | |
|---|---|---|---|---|
| 5,740,074 | A | * | 4/1998 | Wang ...................... G06F 30/23 700/266 |
| 6,840,124 | B2 | * | 1/2005 | Wagner ................... B29C 44/60 436/174 |
| 2004/0217498 | A1 | * | 11/2004 | Ondrus ................... B62D 65/00 264/40.1 |
| 2019/0256642 | A1 | * | 8/2019 | Sick ................... C08G 18/6629 |

FOREIGN PATENT DOCUMENTS

| | | |
|---|---|---|
| JP | H06-270169 | 9/1994 |
| JP | H11-348138 | 12/1999 |
| JP | 4017717 | 12/2007 |
| JP | 2012-091416 | 5/2012 |

OTHER PUBLICATIONS

Official Action (with English translation) for Japanese Patent Application No. 2017-126145, dated Dec. 15, 2020, 7 pages.

Official Action with machine translation for Japan Patent Application No. 2017-126145, dated Mar. 2, 2021, 5 pages.

* cited by examiner

(VARIATION OF EXPANSION RATIO OF FOAMABLE MATERIAL 300'
MAY BE GENERATED)

FILLING APPARATUS FOR FOAMABLE MATERIAL AND FILLING METHOD THEREFOR

CROSS REFERENCE TO RELATED APPLICATIONS

This application claims the benefit of Japanese Patent Application No. 2017-126145, filed on Jun. 28, 2017, the entire disclosure of each of which is incorporated herein by reference.

TECHNICAL FIELD

The disclosure relates to a filling apparatus for a foamable material and a filling method for the foamable material. Particularly, the disclosure relates to a filling apparatus for filling a closed cross section of a vehicle body with a foamable material, and a filling method for the foamable material.

BACKGROUND ART

Figure 4:
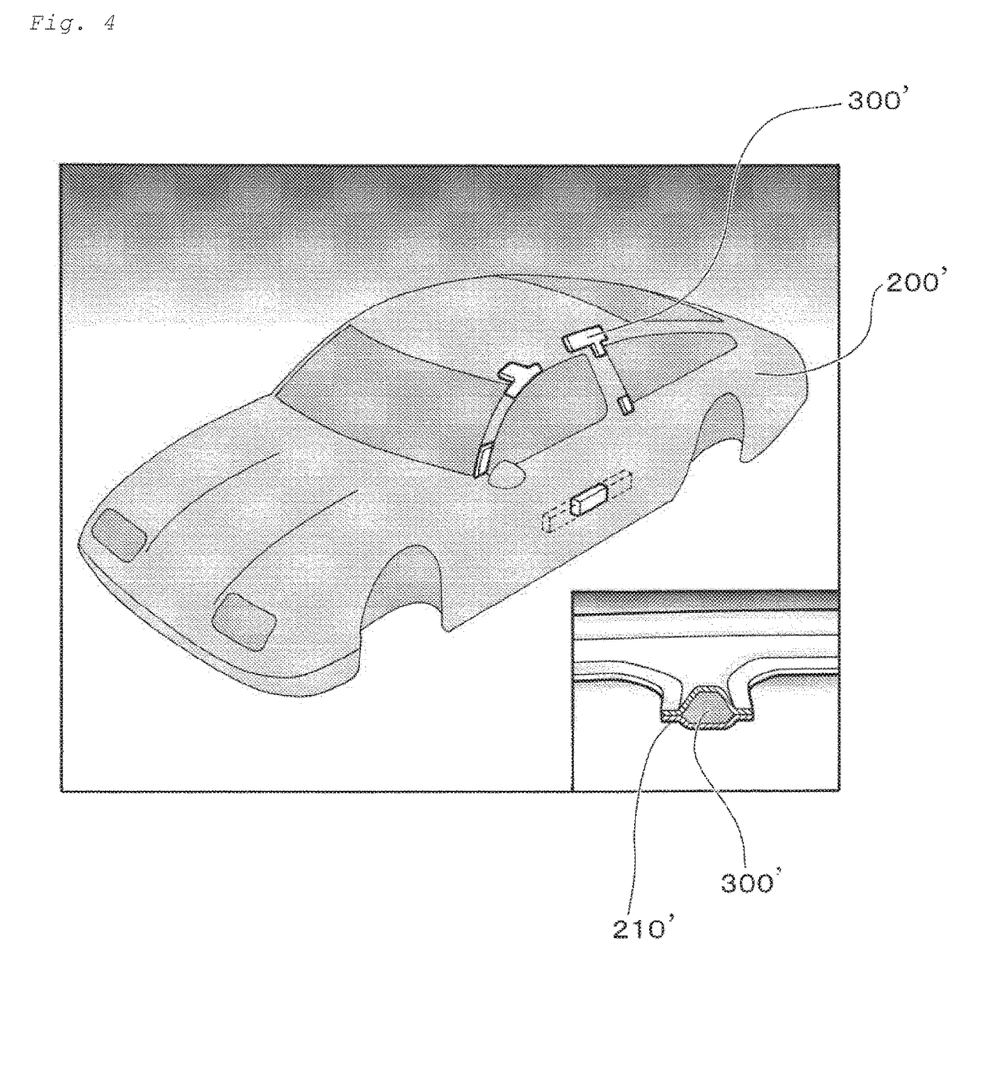
FIG. 4 is a schematic view showing a closed cross section of a vehicle body filled with the foamable material.

A demand has recently been further grown to secure the safety of passengers in a vehicle body of an automobile or the like when the vehicle body collides. To meet the demand, a method has already been adopted, the method being that for filling a closed cross section 210' of a vehicle body such as a pillar which constitutes a portion of a vehicle body 200' with a foam able material 300' such as a foamable two-liquid polyurethane material (see FIG. 4). Specifically, the closed cross section of the vehicle body is filled with the foamable material by delivering the foamable material into the closed cross section of the vehicle body using a delivering part.

PATENT DOCUMENTS

Patent Document 1: Japanese Unexamined Patent Application Publication No. 11-348138
Patent Document 2: Japanese Patent Publication No. 4017717

SUMMARY

Problems to be Solved by the Invention

The inventors of the present application have found that the following problem may arise when the foamable material is delivered into the closed cross section of the vehicle body using the delivering part.

Figure 5:
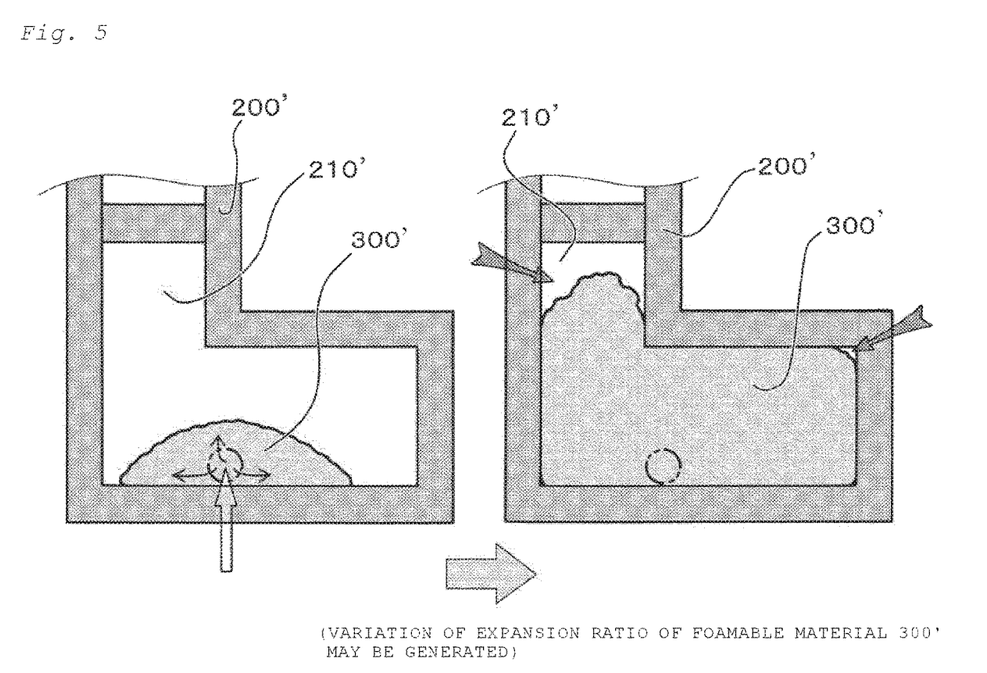
FIG. 5 is a schematic view showing a technical problem found by the inventors of the present application.

For example, when a vehicle body 200' which includes plural closed cross sections 210' having same shapes and equal dimensions is manufactured, it is not easy to control an expansion ratio of the foamable material 300' which is delivered into the closed cross sections 210' of the vehicle body 200', to always be one equal value (see FIG. 5). A variation may therefore occur in the expansion ratio of the foamable material 300' which is delivered into the closed cross sections 210' of the vehicle body 200'. The foamable material 300' having a necessary amount may not be delivered into the closed cross sections 210' of the vehicle body 200' due to the variation of the expansion ratio of the foamable material 300'.

The present invention has been created in view of the above circumstances. An object of the present invention is to provide a filling apparatus and a filling method, each of which is capable of advantageously delivering a foamable material having a necessary amount into a closed cross section of a vehicle body.

Means for Solving Problem

To solve the problem, in an embodiment of the present invention,

A filling apparatus for filling a closed cross section of a vehicle body with a foamable material is provided, wherein
the foamable material is a foamable two-liquid polyurethane material, wherein
the filling apparatus comprises a delivering part for delivering the foamable material into the closed cross section of the vehicle body, and wherein
the filling apparatus further comprises an input part into which a delivery command value and correction values to set a real delivery amount are input.

In a preferable aspect, the filling apparatus further comprises a control part, the control part calculating the real delivery amount of the foamable material from the delivery command value and the correction values, wherein
the correction values are a delivery correction value and an expansion ratio correction value.

In an advantageous aspect, the delivery correction value of the foamable material is an intercept value of an approximate linear formula, the approximate linear formula being calculated in advance from plural delivery time periods of the foamable material set in advance and a standard delivery amount of the foamable material in each of the plural delivery time periods.

In an advantageous aspect, the expansion ratio correction value of the foamable material is a deviation ratio between a standard expansion ratio of the foamable material and a measured expansion ratio of the foamable material.

In an advantageous aspect, the filling apparatus further comprises an expansion ratio measuring part, and wherein
the expansion ratio measuring part comprises a balance for measuring a weight and a sensor which measures a volume of the foamable material.

In an advantageous aspect, the real delivery amount or a real delivery time period of the foamable material is calculated in accordance with a following equation.

A real delivery amount or a real delivery time period of a foamable material=(a delivery command value of the foamable material+(plus) a delivery correction value of the foamable material)× (multiplied by or times) an expansion ratio correction value of the foamable material   [Equation]

In an advantageous aspect, the filling apparatus further comprises an input part into which operation conditions are input, and a storing part which has the operation conditions stored therein, the operation conditions being conditions for supplying a main agent and a curing agent each of which constitutes the foamable material to the delivery part.

In an advantageous aspect, the value measured in advance is controllable to be captured using a remote operation, and wherein
at least one of flow conditions and equipment conditions is controllable to be changed using the remote operation.

In an advantageous aspect, the input part for inputting plural delivery command values is provided, wherein
the real delivery amount is determined using the input delivery command value each input and one pair or plural pairs of the correction values.

In an advantageous aspect, a filling method for filling a closed cross section of a vehicle body with a foamable material is provided, wherein a foamable two-liquid polyurethane material is used as the foamable material, wherein the filling method comprises the step of delivering the foamable material into the closed cross section of the vehicle body using a delivering part, and wherein a real delivery amount or a real time period of the foamable material is determined in advance in accordance with a following equation using at least a delivery correction value and an expansion ratio correction value.

A real delivery amount or a real time period of a foamable material=(a delivery command value of the foamable material+(plus) a delivery correction value of the foamable material)×(multiplied by or times) an expansion ratio correction value of the foamable material [Equation]

Effect of the Invention

According to an embodiment of the present invention, a foamable material having a necessary amount can advantageously be delivered into a closed cross section of a vehicle body at a predetermined location.

DETAILED DESCRIPTION

A filling apparatus 100 according to an embodiment of the present invention will be described with reference to the drawings.

Figure 1:
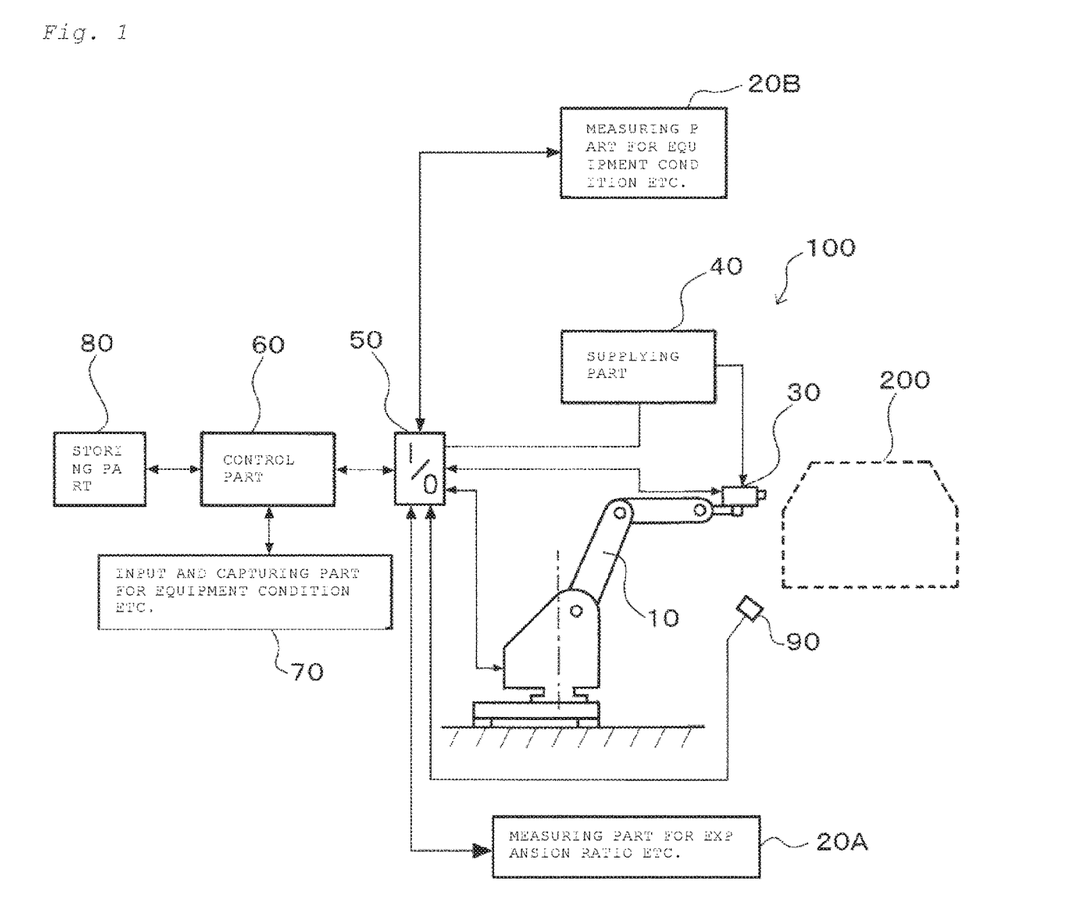
FIG. 1 is a schematic view of a filling apparatus according to an embodiment of the present invention.

FIG. 1 is a schematic view of the filling apparatus according to an embodiment of the present invention. As shown FIG. 1, the filling apparatus 100 according to an embodiment of the present invention includes a moving part 10 which is movable to approach or movable to leave a vehicle body 200, a measuring part 20A for an expansion ratio etc., a measuring part 20B for an equipment condition etc., a delivering part 30, a supplying part 40, a control part 60 which enables a control of each of components in the filling apparatus 100 through an I/O port 50 and which also has a computing function, an input and capturing part 70 for an equipment condition etc., a storing part 80 which has predetermined measured data stored therein, and a position detecting part 90 for detecting whether or not the vehicle body 200 is positioned to enable a delivery by the delivering part 30.

The delivering part 30 is a component of the filling apparatus 100. The delivering part 30 is disposed on a tip portion of the moving part 10 and serves to deliver the foamable material to the vehicle body 200. The supplying part 40 is a component of the filling apparatus 100. The supplying part 40 serves to supply the foamable material to the delivering part 30.

The measuring part 20A for the expansion ratio etc. is a component of the filling apparatus 100. The measuring part 20A serves to measure in advance the expansion ratio of the foamable material which may be delivered to the vehicle body 200 and/or serves to measure in advance a standard delivery amount, the standard delivery amount corresponding to a value which may be taken into consideration in calculating a delivery correction amount below. It is noted in advance that the measuring part 20A for the expansion ratio etc. may be expressed as "a measuring part of an expansion ratio" when the measurement of the expansion ratio is described hereinafter.

The measuring part 20B for the equipment condition etc. may have at least the following function.

A function of measuring the operation state such as a temperature, a flow, a frequency, and a pressure of the supplying part 40

The input and capturing part 70 for the equipment condition etc. may have at least the following function. It is noted in advance that the input and capturing part 70 for the equipment condition etc. may be expressed as "input part" or "capturing part" in accordance with an function thereof.

(1) A function for inputting material parameters of the foamable material which is positioned in the supplying part 40, the material parameters including a specific weight (density) of each of a main agent and a curing agent, and a set density (expansion ratio) of the foamable material (2) A function for inputting operation conditions for the foamable material which is positioned in the supplying part 40, the operation conditions including a temperature, a flow rate (mixing ratio), and a frequency (3) A function for capturing measured values concerning an operation result of the supplying part 40, the operation result including a temperature, a flow rate, a frequency, and a pressure (4) A function for changing the operation conditions for the foamable material (5) A function for inputting a predetermined set delivery command value of the foamable material into the closed cross section of the vehicle body A foamable two-liquid polyurethane material may be used as the foamable material which can be used in the filling apparatus 100 according to an embodiment of the present invention. The foamable two-liquid polyurethane material may have a property that it forms foam and cures in a predetermined temperature range whose temperature control is performed, the predetermined temperature including about 40 degrees corresponding to a temperature which is controlled to be a substantially equal temperature throughout the year, and about 80 degrees corresponding to a temperature for (1) increasing the curing rate and for (2) increasing a mixing performance due to a decrease of the material viscosity. Without being limited to the above embodiment, the foamable two-liquid polyurethane material may have a property that it forms foam and cures at a normal temperature. Without being limited to the above embodiment, the foamable two-liquid polyurethane material may include a main agent (a polyol main agent for example), a curing agent (a polyisocyanate curing agent for example), and water as a foaming agent which is included in the main agent. The foamable two-liquid polyurethane material may further include a reaction catalyst, a foam stabilizer, a coloring agent, a plasticizer, a filler, a flame retardant, an anti-aging agent, an antioxidant agent, and the like.

(Technical Idea of Present Invention)

The present invention has been created based on the following technical idea in view of a technical point that it may not be easy to advantageously deliver a foamable material having a necessary amount into a closed cross section of a vehicle body (or a vehicle body closed cross section) due to a variation of an expansion ratio of the foamable material. Namely, the present invention has been created based on the following technical idea in view of a technical point that there may be a difference between a necessary delivery amount and a real delivery amount corresponding to an actual or an ideal delivery amount) of the foamable material for the closed cross section of the vehicle body.

Specifically, the present invention has been created based on such a technical idea that "the delivery amount to be delivered from a delivering part 30 into the closed cross section of the vehicle body 200 is corrected in advance before being actually delivered, the delivering part 30 being a component of the filling apparatus 100".

In accordance with the technical idea of the present invention, the filling apparatus 100 includes an input part for setting the real delivery amount, the input part having functions for inputting a delivery command value and a correction value, the input part corresponding to an input and capturing part 70 for the equipment condition etc. The input part has the functions for inputting the delivery command value and the correction value, and thus any deviation from the necessary delivery amount can be supplemented by the correction value when the foamable material is actually delivered into the closed cross section of the vehicle body. The supplement allows a reduction of any difference between the necessary delivery amount and the real delivery amount corresponding to the actual or the ideal delivery amount of the foamable material for the closed cross section of the vehicle body. The reduction of the difference may allow the real delivery amount of the foamable material to substantially be equal to the necessary delivery amount of the foamable material. Thus, the foamable material having the necessary amount can be advantageously delivered into the closed cross section of the vehicle body at a predetermined location.

Specifically, in the present invention, an input delivery command value and an input correction value may be converted into the real delivery amount of the foamable material by a control part 60 having a computing function. Although described below in detail, the "correction value" as used herein corresponds to "a delivery correction value" and "an expansion ratio correction value". Thus, in the present invention, the real delivery amount of the foamable material is determined in advance by using at least "the delivery correction value of the foamable material" and "the expansion ratio correction value" before the delivering of the foamable material.

"The delivery correction value of the foamable material" as used herein indicates a delivery adjustment value for adjusting an optional delivery amount of the foamable material in a broad sense when the delivery amount of the foamable material is set, the delivery adjustment value corresponding to an inflation amount. "The delivery correction value of the foamable material" as used herein indicates a value to be added to an optional delivery command value in a narrow sense when the delivery amount of the foamable material is set, or indicates a value to be subtracted from the optional delivery command value in a narrow sense when the delivery amount of the foamable material is set. "The expansion ratio correction value of the foamable material" as used herein indicates a coefficient for correcting or adjusting the expansion ratio of the foamable material in a broad sense. "The expansion ratio correction value of the foamable material" as used herein indicates "a deviation ratio between a standard expansion ratio of the foamable material and a measured expansion ratio of the foamable material" before a delivery of the foamable material in a narrow sense.

The reason why "the delivery correction value of the foamable material" and "the expansion ratio correction value" are especially noted in the present invention is as follows. The reason why "the delivery correction amount of the foamable material" is especially noted is that, when the foamable two-liquid polyurethane material is used as the foamable material, a flow rate in the initial state for mixing and delivering the main agent and the curing agent is different from a flow rate in a steady state, and thus the flow rate and the delivery time period which are elements for calculating the delivery amount are not in the proportional relation which passes through zero (an origin) of a linear formula of "the delivery amount=the flow rate×(multiplied by or times) the delivery time period". The reason why "the expansion ratio correction value of the foamable material" is especially noted is that, due to the variation of the expansion ratio of the foamable material to be delivered, a difference may be generated between an expansion ratio of the foamable material set in advance and a measured expansion ratio of a foamable material to be actually used, the expansion ratio of the foamable material set in advance corresponding to a standard expansion ratio.

(Exemplary Aspect of Present Invention)

An exemplary aspect to realize the main feature corresponding to the technical idea of the present invention will be described below. For realizing the main feature of the present invention, the control part 60 to be a component of the filling apparatus 100 plays a main role. In the present invention, the control part 60 can "voluntarily (automatically)" or "passively in accordance with an instruction by a person such as a worker" drives and controls. In accordance with the driving and the control of the control part 60, components electrically connected to the control part 60 become operable, the components electrically connected to the control part 60 including the moving part 10, the expansion ratio measuring part 20A, the delivering part 30, the supplying part 40, the input and capturing part 70 for the equipment condition etc., the storing part 80, and the position detecting part 90, for example. Among these, for realizing the main feature of the present invention, the supplying part 40, the delivering part 30, and the like may be mainly controlled by the control part 60.

Calculation of "Expansion Ratio Correction Value"

The expansion ratio can generally be calculated using a density (a specific weight) of a raw material and a density thereof after the foam.

The expansion ratio=the density after the foam and curing÷(divided by) the density of the raw material (the mixture density of the main agent and the curing agent)

Measurement of the density after the foam is therefore necessary to calculate the expansion ratio correction value. The set expansion ratio or the set density to be acquired after the foam is input in advance from the input part 70 and is stored in the storing part 50. For example, at a step of filling an automobile closed cross-section with the foamable material in a mass-production line, the measured expansion ratio of the foamable material (the measured foam density) is measured when the operation-start checkout is conducted or when the material is additionally supplied. A predetermined container for measuring the expansion ratio is filled with the foamable material having an optional amount determined in advance from the filling apparatus. After the curing of the foamable material, the density of the foam is measured using a water displacement method or the like. Thus, the measured expansion ratio of the foamable material (the measured foam density) can be calculated. The deviation ratio between the measured expansion ratio of the foamable material (the measured foam density) which is actually measured and the set expansion ratio (the set foam density) is taken as the expansion ratio correction value. This value is input into the input part 70. The control part 60 "voluntarily (automatically)" or "passively in accordance with an instruction by a person such as a worker" driven and controlled causes a start of an operation of the expansion ratio measuring part 20A, and thus an automatic measurement of the expansion ratio is possible. The weight of the foamable material measured using a balance or the like and a filling height of the foamable material may be converted into the measured expansion ratio (the measured foam density), as an example of a calculation method for the measured expansion ratio of the foamable material, the filling height of the foamable material being acquired after the foamable material having a specific amount is delivered into the predetermined container to fill the foamable material and then is cured. With the calculation method, only the filling height of the foamable material cannot directly be converted into the expansion ratio, and a correlation value of the foam density and the filling height can be converted into the measured expansion ratio (the measured foam density) by filling a container determined in advance with the foamable material. Without being especially limited to a specific calculation method, for the expansion ratio by the expansion ratio measuring part 20A to be used in the actual work, the measured expansion ratio may be measured (automatically measured) based on the weight of the foamable material measured using a balance or the like and the volume of the foamable material calculated from a laser displacement gauge, as an example of the calculation method for the measured expansion ratio of the foamable material. In light of the above matters, the expansion ratio measuring part 20A includes a weight measuring balance and a sensor which measures the volume of the foamable material.

After measuring the expansion ratio corresponding to the above measured expansion ratio or the foam density of the foamable material to be used in the real work, the expansion ratio of the foamable material corresponding to the standard expansion ratio or the density of the foam stored and set in advance is taken out from the storing part 80 electrically connected to the control part 60. A deviation ratio (%) between the measured expansion ratio of the foamable material to be used in the real work and the standard expansion ratio of the foamable material set as the standard is calculated (automatically calculated) from these expansion ratios. In the present invention, the deviation ratio (%) is regarded as the "expansion ratio correction value". In accordance with the above, it is possible to calculate "the expansion ratio correction value" which may be taken into consideration in determining in advance the real delivery amount of the foamable material. Any difference of the foam volume after the filling can advantageously be avoided by taking into consideration of "the expansion ratio correction value of the foamable material", the difference being caused by the generation of the difference between the expansion ratio of the foamable material already learned in advance corresponding to the standard expansion ratio and the measured expansion ratio of the actually used foamable material, due to the variation of the expansion ratio of the delivered foamable material.

Calculation of "Delivery Correction Value of Foamable Material"

For example, a standard delivery amount (g) of a standard foamable material is measured in advance in each of predetermined plural delivery time periods, the standard foamable material corresponding to the foamable two-liquid polyurethane material whose mixing ratios are equal to those of the foamable material to be used in the real work, for example. Then, an approximate linear formula is calculated from the plural delivery time periods and the delivery amount of the foamable material in each of the plural delivery time periods. The data on the approximate linear formula including measured values, a slope value, and an intercept value may be stored in the storing part 80 which is electrically connected to the control part 60. In the present invention, the intercept value in the data on the approximate linear formula is handled as "the delivery correction value of the foamable material". Specifically, the intercept value is handled as "the delivery correction amount of the foamable material to be used in the real work". The slope value of the approximate linear formula is set to be a value corresponding to the flow rate to be an operation condition.

Figure 2:
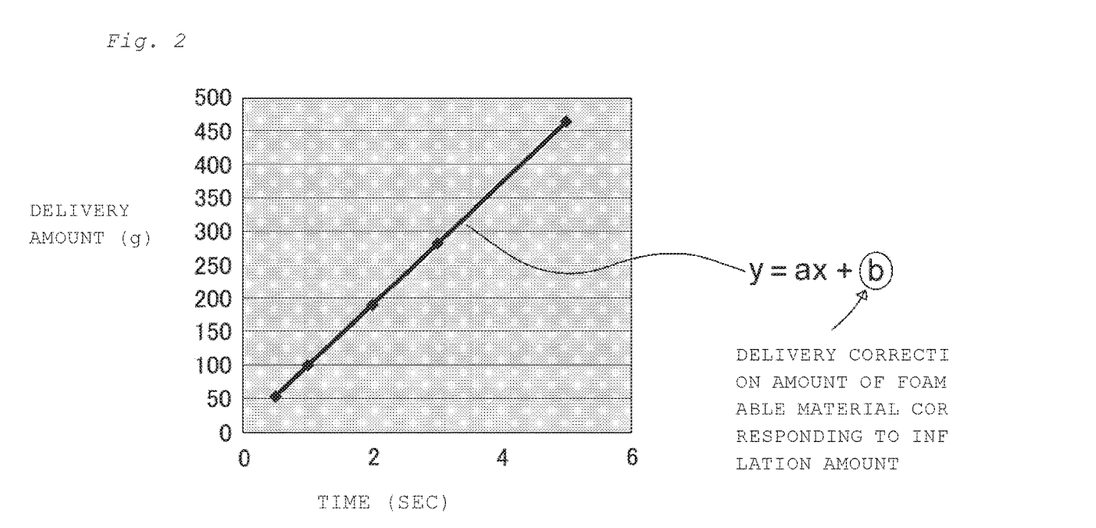
FIG. 2 is a graph of an approximate linear formula calculated in advance from plural delivery time periods of a foamable material set in advance and a standard delivery amount of the foamable material in each of the plural delivery time periods.

Taking an example, for example, five points (such as, for example, 0.5 seconds, 1 second, 2 seconds, 3 seconds, and 5 seconds) are set in advance as plural delivery time periods of the foamable material as shown in FIG. 2, and a standard delivery amount (g) is calculated in each of the plural delivery time periods, the standard delivery amount (g) corresponding to an average value based on three delivery amount values of the foamable material in each of the plural delivery time periods. An intercept value determined by calculating an approximate linear formula is taken as "the delivery correction value of the foamable material", the approximate linear formula being calculated by the plural delivery time periods of the foamable material (such as, for example, 0.5 seconds, 1 second, 2 seconds, 3 seconds, and 5 seconds) and the standard delivery amount of the foamable material in each of the plural delivery time periods. For example, when the intercept value is "not" 0 (zero), it substantially means that a deviation is generated between the flow rate in the initial state of the delivery and the flow rate in the steady state. In accordance with the above, "the delivery correction value" which may be taken into consideration in determining in advance the real delivery amount of the foamable material may be calculated. In the above, a function of the delivery weight and the delivery time period has been exemplified. The function is however not limited to this, instead of the delivery weight, a delivery volume, a move distance of a piston of an apparatus which can provide a constant flow, a rotation amount of an apparatus in a rotary type which can provide a constant flow, and other electric parameters may be used as elements of the function.

Specifically, when the real delivery amount of the foamable material is determined in advance the intercept value (the weight unit) in the data on the approximate linear formula may be invoked from the storing part 80 under the control of the control part 60. Subsequently, the intercept value may be added to (or may be subtracted from) "the initially set delivery command value of the foamable material" input by a worker or the like through the input part corresponding to the input and capturing part 70 for the equipment condition etc. under the control of the control part 60. Thus, any deviation of the initial flow rate of a mixture of the main agent and the curing agent mixed with each other can be advantageously avoided, by taking into consideration of the "delivery correction value" when the foamable two-liquid polyurethane material is used as the foamable material.

Therefore, according to the present invention, the real delivery amount of the foamable material is determined in advance using at least "the delivery correction value of the foamable material" and "the expansion ratio correction value" before the delivery of the foamable material. The present invention therefore can solve in advance problems which may arise when the foamable material is delivered or after the delivery of the foamable material, "in the delivery pre-stage of the foamable material", the problems corresponding to "a problem that the difference is generated between the standard expansion ratio and the measured expansion ratio" and "a problem of the delivery amount-deviation of the foamable material at the starting time of the delivery of the foamable material". This point is an advantageous point of the present invention compared to a conventional technique which does not especially take such actions. With the in-advance action, in the present invention, the foamable material having the necessary amount can advantageously be delivered into any closed cross section of the vehicle body.

An exemplary aspect of the in-advance determination of the real delivery amount will be described.

In an aspect, "the real delivery amount" of the foamable material may finally be determined in advance based on "the real delivery time period" of the foamable material calculated in advance using at least "the delivery correction value of the foamable material" and "the expansion ratio correction value".

Hereinafter, an aspect that "the real delivery amount" of the foamable material is finally determined in advance based on "the real delivery time period" calculated in advance will be described. The real delivery time period (the time period for the delivery to be conducted) can be calculated in accordance with the equation below.

The real delivery time period of the foamable material=((the delivery set amount of the foamable material at the standard expansion ratio (1')+(plus) the delivery correction amount of the foamable material (2'))/the flow rate of the foamable material (3))×(multiplied by or times) the expansion ratio correction coefficient of the foamable material (4)     [Equation]

The real delivery time period of the foamable material=(the delivery set time period of the foamable material at the standard expansion ratio (1)+(plus) the delivery correction time period of the foamable material (2))×(multiplied by or times) the expansion ratio correction value of the foamable material (4)     [Equation]

For the delivery correction value of the foamable material (2) and the expansion ratio correction value of the foamable material (4) of the four parameters in the equations, the measured expansion ratio measured as above (the measured foam forming density) or the expansion ratio correction value may directly be input by a worker or the like into the input part, or these values are automatically calculated under the control of the control part 60. On the other hand, the set amount of the delivery of the foamable material at the standard expansion ratio (1') is determined by "the volume and the shape of the closed cross-section of the vehicle body into which the foamable material may be delivered" for example. The delivery set time period (1) can be calculated by the delivery set amount (1') and the flow rate (3). The flow rate of the foamable material (3) is an operation condition to be determined in advance considering "the mixing ratios of the main agent and the curing agent constituting the foamable material, and the material characteristics of the main agent and the curing agent", a time for conducting mass-production steps, shapes and sizes of a foaming member to be obtained, and a design of the foamable material. The flow rate of the foamable material (3) is stored in the storing part through the input part of the filling apparatus. It may be included that these values are finely adjusted by mainly the foreman or the like who manages the worker.

The parameters corresponding to the real delivery of the foamable material may be represented by the real delivery time period, the real delivery amount, other electric parameters or the like. The delivery command value of the foamable material may be represented by the delivery set time period, the delivery set amount, other electric parameters, or the like. The delivery correction value of the foamable material may be represented by the delivery correction time period, the delivery correction amount, other electric parameters, or the like. The expansion ratio correction value of the foamable material may be represented by a ratio of the set density and the actual density of the foamable material, the ratio being calculated by dividing the actual density of the foamable material by the set density (the actual density of the foamable material/(÷) the set density, or by a ratio of the set expansion ratio and the real expansion ratio of the foamable material, the ratio being calculated by dividing the set expansion ratio of the foamable material by the actual expansion ratio (the set expansion ratio of the foamable material/(÷) the actual expansion ratio).

In the present invention, it is preferred that the following aspects be employed.

In an aspect, it is preferred that the set delivery command value of the foamable material can be input into the input part corresponding to the input and capturing part 70 for the equipment condition etc. It is preferred that the real delivery amount is determined in advance from the necessary delivery amount using at least the delivery correction value and the expansion ratio correction value of the foamable material.

This aspect has been created in view of the actual work environment in which the foamable material is delivered to fill the closed cross section of the vehicle body 200 with the foamable material. As described above, in the present invention, the real delivery amount may automatically be calculated under the control of the control part 60. The foamable material in the real delivery amount can therefore advantageously be automatically delivered from the delivering part 30 under the control of the control part 60 into the vehicle body closed cross section when the worker or the like only inputs the foam density (the expansion ratio) of the foamable material at the time of the operation-start checkout under constant operation conditions for the main agent and the curing agent of the foamable material, i.e., under the operation conditions that the flow rate, the temperature condition, and the like are controlled to be constant. Any work of fine adjustment by the worker or the like is therefore unnecessary. The filling work having the optimized filling amount can be conducted.

In an aspect, it is preferred that the filling apparatus include an input part for inputting plural delivery command values and the real delivery amount is determined using the delivery command values each of which is input, and one pair or plural pairs of the correction values.

A shape of the vehicle body closed cross section which may be formed in the vehicle body 200 may be varied in accordance with the installation location thereof. This means that the volume of the vehicle body closed cross section may be varied in accordance with the installation location thereof. Taking this point into consideration, in this aspect, when the volumes of plural vehicle body closed cross sections differ from each other, the delivery command value based on each of the volumes of the vehicle body closed cross sections is determined under constant operation conditions of the main agent and the curing agent of the foamable material, i.e., under the conditions that the flow rate, the temperature condition, and the like are controlled to be constant. In this aspect, the real delivery amount is calculated by the control part having the computing function, based on the delivery command value, and one pair or plural pairs of the correction values (i.e., "the delivery correction value" and "the expansion ratio correction value"). The reason why the plural pairs of correction values are prepared is that the plural correction values may need to be prepared in accordance with the temperature, the flow, the frequency, the pressure, and the like each of which is the operation condition. The foamable material having the real delivery amount can thereby advantageously be automatically delivered from the delivering part 30 into each of the plural closed cross sections of the vehicle body. Therefore, the work efficiency of the worker and the like can be improved, and the filling quality of the foamable material into the closed cross-sections can be improved.

(Check of Operation Conditions and/or Operation Result of Foamable Material)

The aspect that the real delivery amount of the foamable material is determined in advance has been described above. In the actual work environment, it is however not easy to completely fix the operation conditions for the foamable material (i.e., the main agent, the hardening agent, and the like) positioned in the supplying part 40 in the pre-stage of delivering the foamable material. These conditions may be set to be in a substantially fixed state, i.e., in a somewhat fluctuating state. It is therefore necessary to check the operation conditions for the foamable material positioned in the supplying part 40, and the operation result of the foamable material positioned in the supplying part 40.

In view of the above point, in an aspect, it is preferred that the operation conditions and the operation result of the main agent and the curing agent each positioned in the supplying part 40 are stored (see FIG. 1 and FIG. 2). In an aspect, it is preferred that the stored values can be captured using a remote operation and also the operation conditions of, the main agent and the curing agent can be changed using a remote operation.

This aspect is characterized in that "the operation conditions and the operation result of the foamable material positioned in the supplying part 40" are stored. "The operation conditions of the foamable material positioned in the supplying part 40" as used herein are not especially limited while the operation conditions may include the temperature, the flow rate, the frequency, and the pressure of the foamable material (i.e., the main agent, the hardening agent, and the like) positioned in the supplying part 40. "The operation result of the supplying part 40" as used herein is not especially limited while the operation result may include a filling time period and a filling amount of the foamable material for each filling thereof, and a measurement result of the foamable material under the operation conditions of the foamable material, and measured values of various sensors, and the like.

The operation state is measured by the measuring part 203 controlled by the control part 60 as shown in FIG. 1 and is stored in the storing part. Specifically, information of the measuring part 20B is sent to the storing part at the timing determined in advance under the control of the control part 60 which is "voluntarily (automatically)" or "passively in accordance with an instruction by a person such as a worker" driven and controlled. The measured result and the like can be captured using a remote operation. "The remote operation" as used herein is not especially limited while the remote operation means an operation capable of executing data communication by a computer from a place remote from the work space for actually filling with the foamable material, through a wired LAN (local area network) (i.e., an in-premises (in-house) network) or a wireless LAN, the computer substantially corresponding to the input and capturing part 70 for the equipment condition etc. in FIG. 1. It can be checked whether the operation state of the foamable material in the supplying part 40 is proper, by using the storage content of the operation state.

When the operation state of the foamable material in the supplying part 40 is observed to be improper from the result of the captured measured value, it may be determined that the supplying part 40 does not advantageously function. Thus, a "maintenance of an overall equipment" and the like may be advantageously conducted. Any delivery of an undesired foamable material into any closed cross section of the vehicle body may advantageously be avoided. Any delivery can be discontinued in the pre-stage of delivering into the closed cross section of the vehicle body and production of any rejected product can be avoided by setting a permissible width of the operation state. When the maintenance does not need to be conducted, a control for changing at least one of the flow conditions and the equipment conditions may be executed using a remote operation (e.g., by an operation by a computer through a wired LAN or a wireless LAN) such that at least one of the flow conditions and the equipment conditions becomes proper. Not limiting to this, taking into consideration of the volume of the closed cross section of the vehicle body, at least one of the flow conditions and the equipment conditions may be controlled to be changed using a remote operation (e.g., by an operation by a computer through a wired LAN or a wireless LAN).

Figure 3:
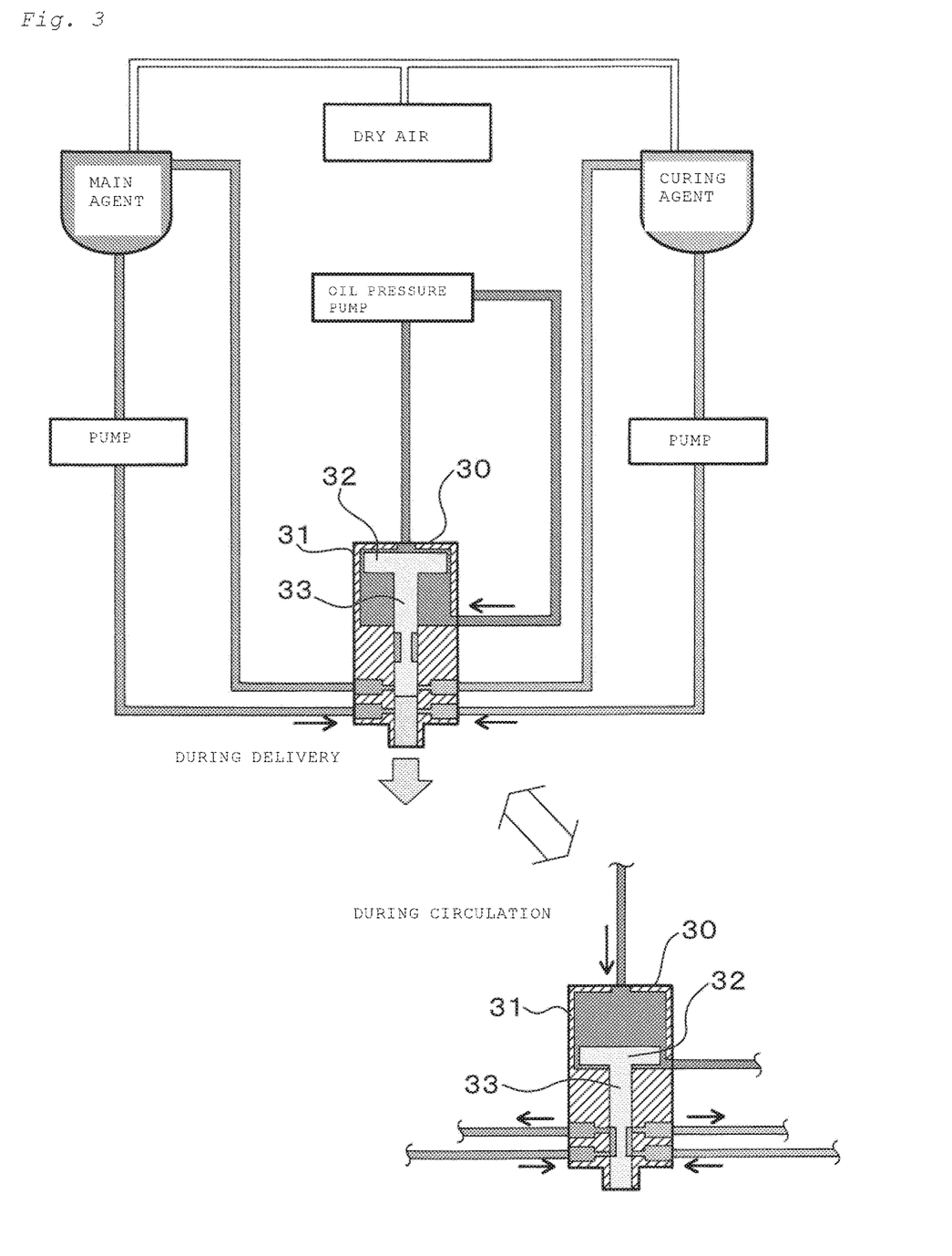
FIG. 3 is a schematic view for describing a movement of a mixing nozzle as a delivering part which is a component of the filling apparatus according to an embodiment of the present invention.

As shown in FIG. 3, the delivering port 30 (so called mixing head) includes a cylinder 31, and a piston 32 which slides in the cylinder 31 and which includes a piston rod 33. The piston 32 becomes slidable by an application of an oil pressure into the cylinder 31. With the sliding of the piton 32, the piston rod 33 also moves, and thus the foamable material is delivered into the closed cross section of the vehicle body. On the other hand, each of the main agent and the curing agent constituting the foamable material (i.e., the foamable two-liquid polyurethane material) may be circulated through a pump without delivering the foamable material. In this case, from the viewpoint of the durability of the filling apparatus, it is preferred that the flow rate of the foamable material during its delivery differs from that of the foamable material during its circulation.

Although not shown, it is preferred that a proximity switch is disposed in a back end portion of the delivering part 30.

The main feature of the present invention is that the real delivery amount is determined in advance taking into consideration of the delivery correction value of the foamable material and the expansion ratio correction value of the foamable material, in order to reduce the difference between the necessary delivery amount and the real delivery amount corresponding to the actual delivered amount of the foamable material into the closed cross section of the vehicle body. To be exact, the delivery time period may however become relatively somewhat shorter than the delivery time period commanded by the control part 60 because the delivery of the foamable material is started at a point in time after a command signal for the delivery is issued from the control part 60 to the delivering part 30 to cause the piston rod 33 of the piston 32 in the delivering part 30 to move using an oil pressure force. In light of the above matters, in an embodiment of the present invention, it is preferred that a measurement of the delivery time period of the foamable material is started by the proximity switch when the piston rod 33 of the piston 32 is pulled.

Filling Method for Foamable Material of Present Invention

A filling method for the foamable material (i.e., the foamable two-liquid polyurethane material) into the closed cross section of the vehicle body will finally be described.

Similar to the filling apparatus according to an embodiment of the present invention, the filling method according to an embodiment of the present invention has been created based on the technical idea that "the delivery amount to be delivered from the delivering part 30 which is a component of the filling apparatus 100 into the vehicle body closed cross section of the vehicle body 200 is corrected in advance before being actually delivered". In accordance with the technical idea, the filling method of the present invention is characterized in that the real delivery amount of the foamable material is determined in advance using at least "the delivery correction value of the foamable material" and "the expansion ratio correction value" before the delivery of the foamable material.

In the filling method according to an embodiment of the present invention, an operation of the expansion ratio measuring part 20A is started by the control part 60 which is driven and controlled "voluntarily (automatically)" or "passively in accordance with an instruction by a person such as a worker". With the start of the operation, the expansion ratio of the foamable material to be delivered into the closed cross section of the vehicle body 200 is measured (automatically measured) using the expansion ratio measuring part 20A. After the expansion ratio of the foamable material to be used in the real work is measured (automatically measured), the expansion ratio of the foamable material in the ideal environment stored in advance is taken out from the storing unit 80 electrically connected to the control part 60. Based on the measured expansion ratio of the foamable material to be used in the real work and the standard expansion ratio of the foamable material set in advance, the deviation ratio (%) between these two ratios is calculated (automatically calculated). In the filling method of the present invention, the deviation ratio (%) is handled as "the expansion ratio correction value". Thus, "the expansion ratio correction value" which may be taken into consideration in determining in advance the real delivery amount of the foamable material may be calculated. It can advantageously be avoided that a difference may be generated between the expansion ratio of the foamable material learned in advance corresponding to the standard expansion ratio and the measured expansion ratio of the actually used foamable material, by taking into consideration "the expansion ratio correction value of the foamable material", the difference being due to the variation of the expansion ratio of the foamable material to be delivered.

In the filling method according to an embodiment of the present invention, the standard delivery amount (g) of the standard foamable material is measured in each of the predetermined plural delivery time periods under the control of the control part 60 which is driven and controlled "voluntarily (automatically)" or "passively in accordance with an instruction by a person such as a worker". An approximate linear formula is calculated from the plural delivery time periods and the standard delivery amount of the foamable material in each of the plural delivery time periods. The data on the approximate linear formula (the measured values, the slope value, and the intercept value) is stored in the storing part 80 which is electrically connected to the control part 60. In the filling method according to an embodiment of the present invention, the intercept value in the data on the approximate linear formula is handled as "the delivery correction amount of the foamable material to be used in the real work". The slope value of the approximate linear formula is set to be a value corresponding to the flow rate which is an operation condition. In the filling method according to an embodiment of the present invention, it is checked that the slope value is a value corresponding to the flow rate which is an operation condition.

As an example, when the real delivery amount of the foamable material is determined in advance, under the control of the control part 60, the intercept value (the weight unit) on the axis of ordinate in the data on the approximate linear formula may be invoked from the storing part 80. Subsequently, the intercept value is added to (or is subtracted from) "the initially set delivery command value (the weight) of the foamable material" which may be input by a worker or the like through the input part corresponding to input and capturing part 70 for the equipment condition etc. In the above, the intercept value (the axis of ordinate) is represented using the weight unit while the unit is not limited to this and the intercept value (the axis of ordinate) may be represented using a time unit. In light of the above matters, any deviation of the delivery amount can be advantageously avoided by taking "the delivery correction amount" into consideration, the deviation being due to the fact that, in a case where the foamable two-liquid polyurethane material is used as the foamable material, the flow rate in the initial state upon the mixing and delivering the main agent and the curing agent differs from the flow rate in the steady state, and thus the flow rate and the delivery time period which are elements for calculating the delivery amount are not in the proportional relation to pass through zero (the origin) of the linear formula of "the delivery amount=the flow rater (multiplied by or times) the delivery time period" and thus the flow rate may be unstable.

From the above, the filling method according to an embodiment of the present invention can solve in advance "the problem that the difference may be generated between the standard expansion ratio and the measured expansion ratio" and "the problem of the destabilization of the flow rate of the foamable material at the time of the start of the delivery of the foamable material" in the delivery pre-stage of the foamable material. With the in-advance aspect, the filling method according to an embodiment of the present invention allows the foamable material having the necessary amount to be advantageously delivered into any closed cross section of the vehicle body.

An embodiment of the present invention has been described while a typical example in the applicable scope of the present invention has only been exemplified. Those skilled in the art should therefore easily understand that the present invention is not limited to this and various changes may be made thereto.

EXPLANATION OF REFERENCE NUMERALS

10 Moving part
20A Measuring part for expansion ratio etc.
20B Measuring part for equipment condition etc.
30 Delivering part
31 Cylinder
32 Piston
33 Piston rod
40 Supplying part
50 Input and output (I/O) apparatus
60 Control part
70 Input and capturing part for equipment condition etc.
80 Storing part
90 Position detecting part
100 Filling apparatus
200, 200' Vehicle body
210' Closed cross section of vehicle body
300' Foamable material

The invention claimed is:

1. A filling apparatus for filling a closed cross section of a vehicle body with a foamable material, comprising:
   a control part operable to calculate a real delivery amount of the foamable material from a delivery command value and correction values;
   a delivering part for delivering the foamable material into the closed cross section of the vehicle body, wherein the foamable material is a foamable two-liquid polyurethane material; and
   an input part into which the delivery command value and the correction values to set the real delivery amount are input, wherein the correction values comprise a delivery correction value of the foamable material, wherein the delivery correction value is an intercept value of an approximate linear formula, the approximate linear formula being calculated in advance from plural delivery time periods of the foamable material set in advance and a standard delivery amount of the foamable material in each of the plural delivery time periods.

2. The filling apparatus according to claim 1, wherein the control part is operable to calculate the correction values based on an expansion ratio correction value of the foamable material, and wherein the control part is operable to calculate the expansion ratio correction value of the foamable material based on a deviation ratio between a standard expansion ratio of the foamable material and a measured expansion ratio of the foamable material.

3. The filling apparatus according to claim 2,
   wherein the filling apparatus further comprises an expansion ratio measuring part, and
   wherein the expansion ratio measuring part comprises a balance for measuring a weight and a sensor which measures a volume of the foamable material.

4. The filling apparatus according to claim 2, wherein the control part is operable to calculate the real delivery amount or a real delivery time period of the foamable material in accordance with an equation, comprising:

A real delivery amount or a real delivery time period of a foamable material=(a delivery command value of the foamable material+a delivery correction value of the foamable material)×an expansion ratio correction value of the foamable material.

5. The filling apparatus according to claim 1,
   wherein the real delivery amount or a real delivery time period of the foamable material is calculated in accordance with an equation, comprising:

A real delivery amount or a real delivery time period of a foamable material=(a delivery command value of the foamable material+a delivery correction value of the foamable material)×an expansion ratio correction value of the foamable material.

6. The filling apparatus according to claim 1, wherein operation conditions are input into the input part, and wherein the filling apparatus further comprises a storing part which has the operation conditions stored therein, the operation conditions being conditions for supplying a main agent and a curing agent each of which constitutes the foamable material to the delivery part.

7. The filling apparatus according to claim 6,
   wherein a value stored in advance by the storing part is controllable to be captured using a remote operation, and
   wherein at least one of flow conditions and equipment conditions is controllable to be changed using the remote operation.

8. The filling apparatus according to claim 1,
   wherein the input part for inputting plural delivery command values is provided, and
   wherein the real delivery amount is determined using the delivery command values each of which is input and one pair or plural pairs of the correction values.

9. The filling apparatus according to claim 1, wherein the control part calculates the real delivery amount or a real delivery time period of the foamable material in accordance with an equation, comprising:

A real delivery amount or a real delivery time period of a foamable material=(a delivery command value of the foamable material+a delivery correction value of the foamable material)×an expansion ratio correction value of the foamable material.

10. A filling method for filling a closed cross section of a vehicle body with a foamable material, comprising:
    delivering the foamable material into the closed cross section of the vehicle body using a delivering part, wherein a foamable two-liquid polyurethane material is used as the foamable material; and
    determining a real delivery amount or a real time period of the foamable material in advance in accordance with an equation using at least a delivery correction value and an expansion ratio correction value, the equation comprising:

A real delivery amount or a real time period of a foamable material=(a delivery command value of the foamable material+a delivery correction value of the foamable material)×an expansion ratio correction value of the foamable material.

11. A filling apparatus for filling a closed cross section of a vehicle body with a foamable material, comprising:
    a delivering part for delivering the foamable material into the closed cross section of the vehicle body, wherein the foamable material is a foamable two-liquid polyurethane material;
    an input part into which a delivery command value and correction values to set a real delivery amount are input, wherein the correction values comprise a delivery correction value of the foamable material, wherein the delivery correction value is an intercept value of an approximate linear formula, the approximate linear formula being calculated in advance from plural delivery time periods of the foamable material set in advance and a standard delivery amount of the foamable material in each of the plural delivery time periods; and a control part to calculate the correction values based on an expansion ratio correction value of the foamable material, wherein the control part is operable to calculate the expansion ratio correction value of the foamable material based on a deviation ratio between a standard expansion ratio of the foamable material and a measured expansion ratio of the foamable material.

12. The filling apparatus according to claim 11, wherein the control part is further operable to calculate the real delivery amount of the foamable material from the delivery command value and the correction values.

13. The filling apparatus according to claim 11, further comprising an expansion ratio measuring part including a balance for measuring a weight and a sensor which measures a volume of the foamable material.

14. The filling apparatus according to claim 11, wherein operation conditions are input into the input part.

15. The filling apparatus according to claim 14, further comprising a storing part which has the operation conditions stored therein.

16. The filling apparatus according to claim 15, wherein:
a value stored in advance by the storing part is controllable to be captured using a remote operation; and
at least one of flow conditions and equipment conditions is controllable to be changed using the remote operation.

17. The filling apparatus according to claim 14, wherein the operation conditions are conditions for supplying a main agent and a curing agent each of which constitutes the foamable material to the delivery part.

18. The filling apparatus according to claim 11,
wherein the input part for inputting plural delivery command values is provided, and
wherein the real delivery amount is determined using the delivery command values each of which is input and one pair or plural pairs of the correction values.

19. The filling apparatus according to claim 11, wherein the control part calculates the real delivery amount or a real delivery time period of the foamable material in accordance with an equation, comprising:

A real delivery amount or a real delivery time period of a foamable material=(a delivery command value of the foamable material+a delivery correction value of the foamable material)×an expansion ratio correction value of the foamable material.

* * * * *